(12) United States Patent
Arvidsson et al.

(10) Patent No.: US 8,255,921 B2
(45) Date of Patent: Aug. 28, 2012

(54) METHOD AND APPARATUS THAT ENABLES A WEB-BASED CLIENT-SERVER APPLICATION TO BE USED OFFLINE

(75) Inventors: Erik V. Arvidsson, San Francisco, CA (US); Andrew J. Palay, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1236 days.

(21) Appl. No.: 11/809,162

(22) Filed: May 30, 2007

(65) Prior Publication Data

US 2008/0301221 A1     Dec. 4, 2008

(51) Int. Cl.
G06F 3/00 (2006.01)
G06F 9/44 (2006.01)
G06F 9/46 (2006.01)
G06F 13/00 (2006.01)

(52) U.S. Cl. ........ 719/311; 719/312; 719/313; 718/100; 718/104

(58) Field of Classification Search ............ None
See application file for complete search history.

(56) References Cited

U.S. PATENT DOCUMENTS

| | | | |
|---|---|---|---|
| 2001/0016034 A1* | 8/2001 | Singh et al. | 379/88.17 |
| 2003/0233404 A1* | 12/2003 | Hopkins | 709/203 |
| 2005/0197819 A1* | 9/2005 | Hopkins et al. | 703/22 |
| 2007/0117584 A1* | 5/2007 | Davis et al. | 455/550.1 |
| 2008/0086540 A1* | 4/2008 | Scott et al. | 709/217 |
| 2008/0104195 A1* | 5/2008 | Hawkins et al. | 709/217 |
| 2008/0147671 A1* | 6/2008 | Simon et al. | 707/10 |

OTHER PUBLICATIONS

O'Callahan, Robert et al., "Well, I'm Back: Offline Web Applications", Weblog Mozillazine (online), Feb. 14, 2007, http://weblogs.mozillazine.org/roc/archives/2007/02/offline_web_app.html, downloaded Jan. 23, 2009.

Kennedy, Niall: "Offline Web Applications", Niall Kennedy's Podcast, (online), Apr. 23, 2007, http://www.niallkennedy.com/podcast/2007/04/offlina-web-applications.html, downloaded Jan. 23, 2009.

Gamma E et al., "Design Patterns: Elements of Reusable Object-Oriented Software", Design Patterns. Elements of Reusable Object-Oriented Software, XX, XX, Jan. 1, 1995, pp. 315-323.

Neuberg, Brad, "The Dojo Offline API", The Sitepen Blog, (online), Jan. 23, 2007, http://www.sitepen.com/blog/2007/01/23/the-dojo-offline-api/>.

* cited by examiner

*Primary Examiner* — Emerson Puente
*Assistant Examiner* — Jonathan R Labud
(74) *Attorney, Agent, or Firm* — Harrity & Harrity, LLP

(57) ABSTRACT

One embodiment of the present invention provides a system that facilitates using a web-based client-server application offline. During operation, the system receives a function call at an object within a browser that is executing on a client, wherein the function call is generated by the web-based client-server application and is directed to a communication layer on the client. Next, the system determines an intended resource for the function call. The system also determines if the function call should be redirected to an alternate resource. If so, the system redirects the function call to the alternate resource. If not, the system forwards the function call to the intended resource. Note that in some embodiments of the present invention, the entire system operates within the context of the browser.

33 Claims, 4 Drawing Sheets

```
/**
 * Calls the callback function with an array of of email addresses returned
 * from the server
 * @param {Function} callback  The function to call with the data
 */
function getAutoCompleteEmailAddresses(callback) {
  var xhr = new XMLHttpRequest();
  xhr.open('GET', getAutoCompleteUri(), true);
  xhr.onload = function() {
    callback(xhr.responseText.split('\n'));
  };
  xhr.send(null);
}
```

FIG. 3A

```
/**
 * Creates a function that will call different servers depending on which
 * server to use.
 * @param {Function} f  The function to create a proxy for.
 * @param {String} type  Something identifying what kind of request this is
 * @return {Function} The new function that should replace the original
 */
function createProxy(f, type) {
  return function() {
    var params = argument;
    if (useServerA) { // original server
      return f.apply(null, params);
    } else if (useServerB) {
      switch (type) {
        case 'autocomplete':
          var callback = params[0];
          callback(['a@domain.com', 'b@domain.com']);
          break;
        ...
      }
    } else if (useServerC) {
      ...
    } ...
  };
}

// replace original function with the proxied function
getAutoCompleteEmailAddresses =
    createProxy(getAutoCompleteEmailAddresses, 'autocomplete');
```

FIG. 3B

METHOD AND APPARATUS THAT ENABLES A WEB-BASED CLIENT-SERVER APPLICATION TO BE USED OFFLINE

BACKGROUND

1. Field of the Invention

The present invention relates to web browsers. More specifically, the present invention relates to a method and an apparatus that enables a web-based client-server application to be used offline.

2. Related Art

Scripting languages and dynamic components are often used in web pages to provide complex functionality to a user. Web servers process many of these scripts and components, and send the resulting output HyperText Markup Language (HTML) code to a browser for display to the user. However, this type of client-server web application requires a connection to the web server to be able to use the client-server web application.

In order to facilitate offline browsing, browsers typically provide a caching mechanism which enables every web page that is delivered to the browser to be stored in a browser cache. At some subsequent time, if the user attempts to view a previously viewed page and the client does not have a connection to the web server that hosted the web page, the browser can retrieve a copy of the web page from the browser cache and can display the copy of the web page to the user.

Modern web applications deliver display logic and data to the browser, such as JavaScript with HTML. Sometime this data has been preformatted for display purpose and sometimes the data is very raw. In either case, the files that are cached are only a snapshot of the data at one point in time, and may be irrelevant to the user at a subsequent time. Moreover, in many instances, the web application prevents this data from being cached.

Consider the example of a browser-based email application. If the browser cache only contains a static representation of the web page from the last time the user visited the browser-based email site, then the web page retrieved from the cache will not be very useful to the user. If the user is only presented with static representations of what was previously viewed, and the server-side logic is not being executed, then the user's actions on the cached pages do not result in the actions intended by the user. Moreover, this can lead to confusion because the user might believe that he or she performed some action that was actually not performed because the server-side logic was not executed.

Hence, what is needed is a method and an apparatus for viewing dynamic web pages in a browser without the problems listed above.

SUMMARY

One embodiment of the present invention provides a system that facilitates using a web-based client-server application offline. During operation, the system receives a function call at an object within a browser that is executing on a client, wherein the function call is generated by the web-based client-server application and is directed to the browser's communication layer. Next, the system determines an intended resource for the function call. The system also determines if the function call should be redirected to an alternate resource within the web-application. If so, the system redirects the function call to the alternate resource. If not, the system forwards the function call to the intended server-based resource.

In some embodiments of the present invention, the alternate resource replicates the actions of the server-based resource. In these embodiments, the alternate resource performs the functions of the server-based resource in a manner which is transparent to the client. While the alternate resource replicates the actions of the server, the alternate resource may or may not execute the same code as the server.

In some embodiments of the present invention, determining if the function call should be redirected to an alternate resource involves determining if the client is working in an offline mode.

In some embodiments of the present invention, determining if the function call should be redirected to an alternate resource involves determining if the intended resource is not reachable.

In some embodiments of the present invention, determining if the function call should be redirected to an alternate resource involves receiving a redirection command from the web-based client-server application.

In some embodiments of the present invention, the intended resource is located on a server and the alternate resource is located on the client.

In some embodiments of the present invention, the web-based client-server application is an Asynchronous JavaScript and XML (AJAX) application.

In some embodiments of the present invention, redirecting the function call involves redirecting the function call in a manner that is not visible to a user.

In some embodiments of the present invention, the object is part of the browser.

In some embodiments of the present invention, the object is a browser extension.

In some embodiments of the present invention, the object is external to the browser, and has hooks into a framework of the browser.

BRIEF DESCRIPTION OF THE FIGURES

FIG. 3A illustrates an AJAX function in accordance with an embodiment of the present invention.

FIG. 3B illustrates a proxy AJAX function in accordance with an embodiment of the present invention.

DETAILED DESCRIPTION

Figure 1:
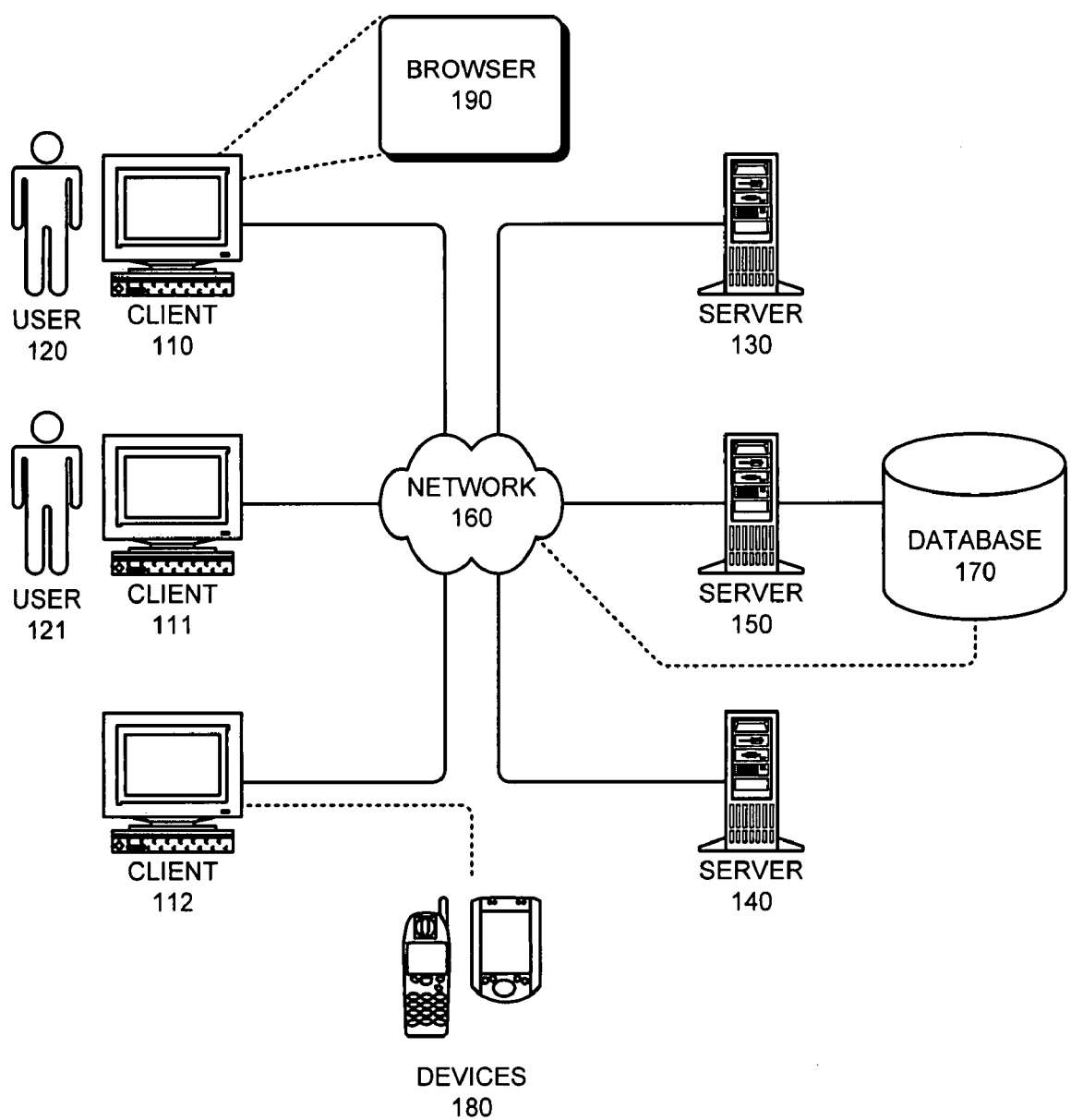
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

One embodiment of the present invention provides a system that facilitates using a web-based client-server application offline. During operation, the system receives a function call at an object within a browser which is executing on a client, wherein the function call is generated by the web-based client-server application and is directed to the browser's communication layer on the client. Next, the system determines an intended resource for the function call. The system also determines if the function call should be redirected to an alternate resource within the web-application. If so, the system redirects the function call to the alternate resource. If not, the system forwards the function call to the intended server-based resource.

In some embodiments of the present invention, the alternate resource replicates the actions of a server-based resource. In these embodiments, the alternate resource performs the functions of the server-based resource which makes it appear that the client is communicating with the server. While the alternate resource replicates the actions of the server, the alternate resource may or may not execute the same code as the server. In many embodiments, the alternate resource executes different code that performs similar functionality as the server. Note that the alternate resource may include client-side Asynchronous JavaScript and XML (AJAX) to replicate the functionality of the server-side components to present a similar view to a user as if the client was communicating with the server.

In some embodiments of the present invention, determining if the function call should be redirected to an alternate resource involves determining if the client is working in an offline mode.

In some embodiments of the present invention, determining if the function call should be redirected to an alternate resource involves determining if the intended resource is not reachable.

In some embodiments of the present invention, determining if the function call should be redirected to an alternate resource involves receiving a redirection command from the web-based client-server application.

In some embodiments of the present invention, the intended resource is located on a server and the alternate resource is located on the client.

In some embodiments of the present invention, the web-based client-server application is an Asynchronous JavaScript and XML (AJAX) application.

In some embodiments of the present invention, redirecting the function call involves redirecting the function call in a manner that is not visible to a user.

In some embodiments of the present invention, the object is part of the browser.

In some embodiments of the present invention, the object is a browser extension.

In some embodiments of the present invention, the object is external to the browser, and has hooks into a framework of the browser.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, and devices 180.

Clients 110-112 can include any node on a network including computational capability and including a mechanism for communicating across the network.

Similarly, servers 130-150 can generally include any node on a network including a mechanism for servicing requests from a client for computational and/or data storage resources.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network, such as network 160.

Devices 180 can include any type of electronic device that can be coupled to a client, such as client 112. This includes, but is not limited to, cell phones, Personal Digital Assistants (PDAs), smart-phones, personal music players (such as MP3 players), gaming systems, digital cameras, portable storage media, or any other device that can be coupled to the client. Note that in some embodiments of the present invention, devices 180 can be coupled directly to network 160 and can function in the same manner as clients 110-112.

Browser 190 is installed on client 110. In one embodiment of the present invention, browser 190 can include any program that is capable of displaying web pages that include scripts. Note that browser 190 can be installed on any computational device, such as clients 110-112, servers 130-150, and devices 180.

Browser

Figure 2:
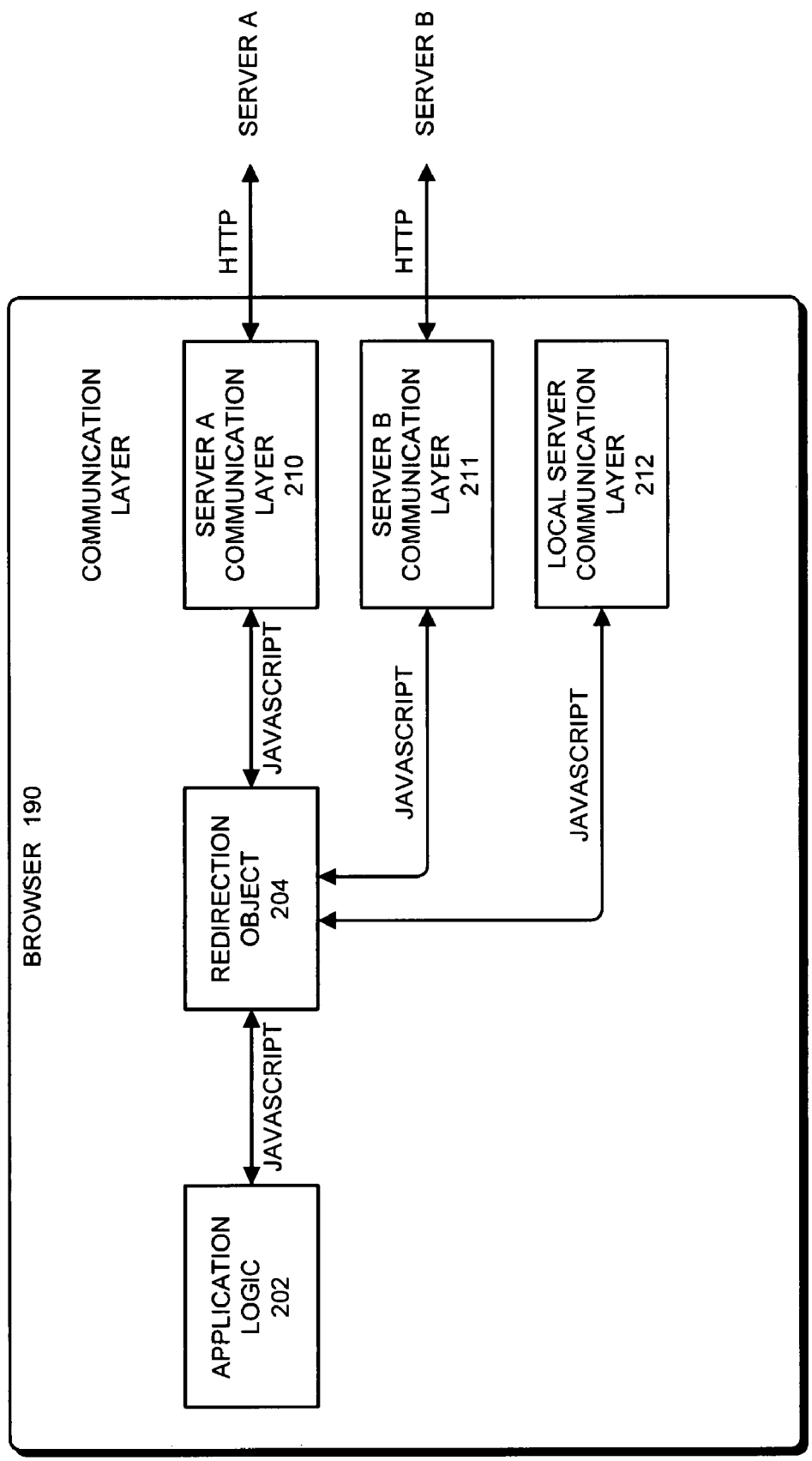
FIG. 2 illustrates a browser in accordance with an embodiment of the present invention.

FIG. 2 illustrates a browser 190 in accordance with an embodiment of the present invention. Browser 190 includes: application logic 202, redirection object 204, server A communication layer 210, server B communication layer 211, and local server communication layer 212. In a traditional web application, application logic 202 is coupled to server communication layer 210, and communicates with server A via server A communication layer 210. However, embodiments of the present invention include a redirection object 204 which may direct function calls: (1) to server A communication layer 210, (2) to the communication layer associated with another remote server (such as server B communication layer 211), or (3) to a different resource (such as local server communication layer 212). Note that browser 190 can execute on any node including computational capability, including clients 110-112, servers 130-150, and devices 180.

In some embodiments of the present invention, application logic 202 communicates with redirection object 204, and redirection object 204 communicates with: server A communication layer 210, server B communication layer 211, and local server communication layer 212 via JavaScript™. While JavaScript™ is shown in these embodiments, in general any method for communicating between these components may be used.

Redirection object 204 intercepts function calls to the communications layer and redirects these calls based upon predetermined criteria, such as: if the intended destination is unreachable, if the browser 190 is marked as offline, if directed by application logic 202, or any other criteria. Redirection object 204 may redirect function calls to remote servers (servers 130-150), local servers executing on the same client 110, as well as resources which are internal and/or external to client 110, such as database 170.

In some embodiments of the present invention, redirection object 204 directs the function calls to local server communication layer 212. Local server communication layer 212 acts as a liaison between browser 190 and a local server executing on the same client 110 as browser 190. Such a redirection may be beneficial in cases where client 110 is disconnected from network 160, and thus has no connection to the intended resource.

Note that the local server executing on client 110 may include code that performs the same functionality as the server code, or alternatively, cached copies of the server code, including any server-side scripting, such as Java Server Pages (JSP) code and Active Server Pages (ASP) code. In this example, the local server processes the server-side code in lieu of the intended server. Furthermore, the end-result is transparent to the user 120. To user 120, it appears no different than if redirection object 204 forwarded the function call to the intended server rather than to the local server.

Exemplary AJAX Function

In one embodiment of the present invention, a programmer identifies the functions and methods that call the server, and then creates proxies for those functions. Note that this is possible in JS because JS is a dynamic language that allows the redefinition of functions and methods at runtime. In this embodiment, the programmer redefines the function so that the function tests which server to use, and then calls the desired server implementation.

FIG. 3A illustrates an Asynchronous JavaScript and XML (AJAX) function prior to modification in accordance with an embodiment of the present invention. FIG. 3B illustrates a proxy AJAX function in accordance with an embodiment of the present invention. In the example illustrated in FIG. 3B, a programmer does not have to modify every single function, but instead, can centralize the communication layer to one single entry point. When writing the code for the application, the programmer can simply make each function call via the create Proxy( ) function. Note that for embodiments of the present invention, a proxy function is defined as a function that is invoked in place of an existing function, and then determines whether to invoke the existing function, to invoke an alternate function, or to invoke the existing function with different arguments. This is in contrast to a "proxy" that stores content at the proxy and acts on behalf of existing servers by returning content from the proxy rather than from the servers when requests are made.

Redirecting a Function Call

Figure 4:
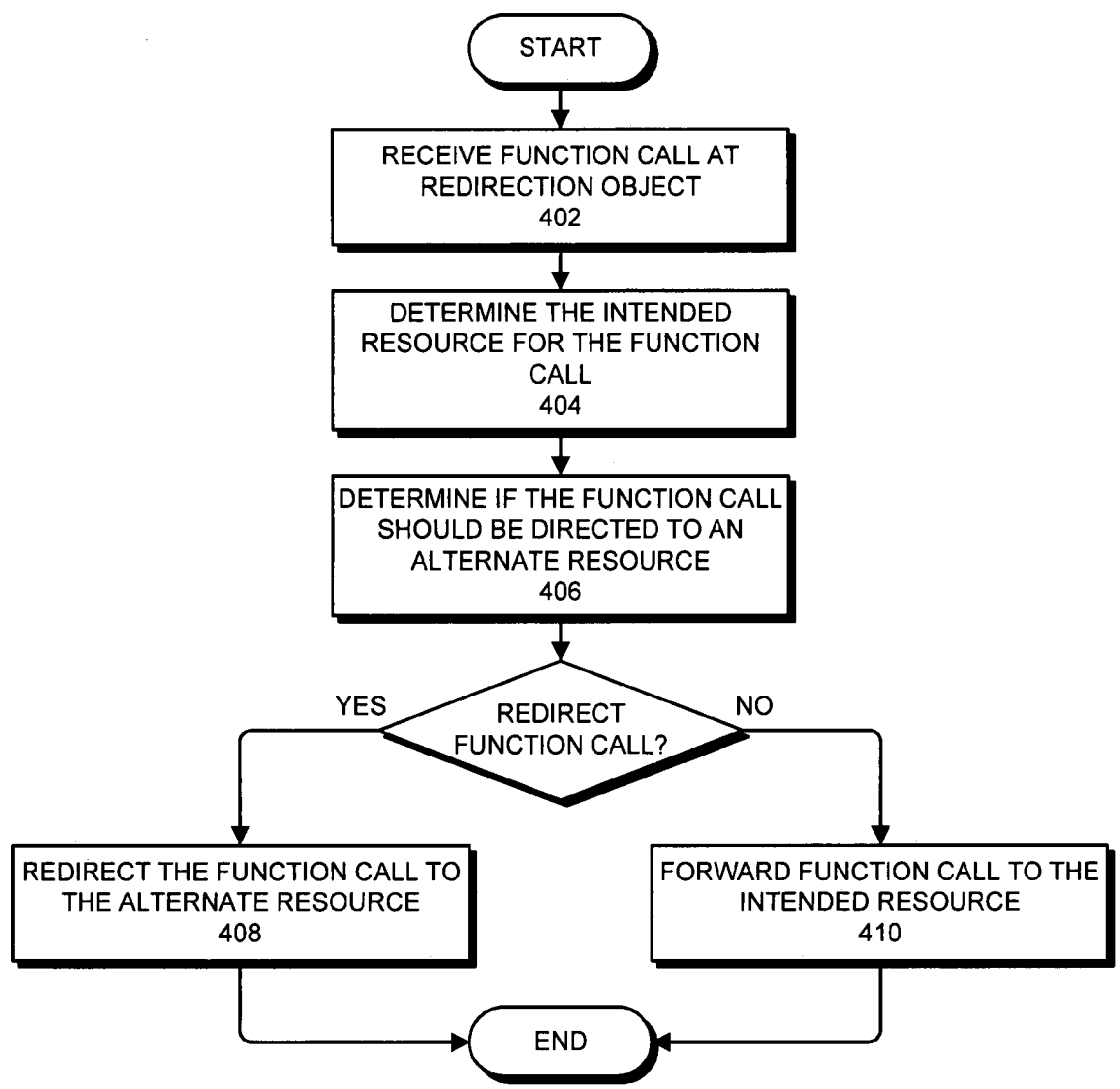
FIG. 4 presents a flow chart illustrating the process of redirecting a function call in accordance with an embodiment of the present invention.

FIG. 4 presents a flow chart illustrating the process of redirecting a function call in accordance with an embodiment of the present invention. During operation, the system receives a function call at redirection object 204 (operation 402) and determines the intended resource for the function call (operation 404). Next, the system determines if the function call should be directed to an alternate resource (operation 406). Note that this redirection decision is based upon predetermined criteria, such as: if the intended destination is unreachable, if the browser 190 is marked as offline, if directed by application logic 202, or any other criteria. Redirection object 204 may redirect function calls to remote servers (servers 130-150), local servers executing on the same client 110, as well as resources internal and/or external to client 110, such as database 170.

If the function call should be directed to an alternate resource, redirection object 204 redirects the function call to the alternate resource (operation 408). However, if not, redirection object 204 forwards the function call to the intended resource (operation 410).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method comprising:
    storing, by a client, an application that includes a function to perform a process,
        where the application invokes the function when the process is to be performed,
        where, when invoked by the application, the function accesses, via a network, a server to perform the process,
        where the server processes the function to obtain data, and
        where the application receives the obtained data, via a communication layer of the client;
    replacing, by the client, the function with a proxy function to modify the application,
        where replacing the function with the proxy function to modify the application causes the application to invoke the proxy function when the process is to be performed;
    determining, at the client and by the application, that the process is to be performed;
    invoking, at the client, the proxy function, where the proxy function is invoked by the application based on determining that the process is to be performed;
    determining, at the client and by the proxy function, whether to access the server or an alternate resource to perform the process, where determining whether to access the server or the alternate the alternate resource includes at least one of:
        determining whether the network is available, or
        determining whether the server is available;
    accessing, at the client and by the proxy function the alternate resource to perform the process when:
        the network is unavailable, or
        the server is unavailable; and
    accessing, at the client and by the proxy function the server to process the function when:
        the network is available, and
        the server is available.

2. The method of claim 1, where the alternate resource is stored locally on the client and replicates actions of the server during execution of the application.

3. The method of claim 1, where determining whether to access the server or the alternate resource further includes:
    determining whether the client is working in an offline mode, where the client works in the offline mode when the network and the server are unavailable.

4. The method of claim 1, where the alternate resource is located on a device that is external to the client.

5. The method of claim 1, where the application is an Asynchronous JavaScript and XML (AJAX) application, and where the client replaces the function with the proxy function to modify the application at a runtime of the AJAX application.

6. The method of claim 1, where accessing the alternate resource includes:
accessing the proxy function via a second communication layer of the client that is different than the communication layer of the client, where the second communication layer is associated with the alternate resource and the communication layer is associated with the server.

7. The method of claim 1, where the proxy function is associated with an object of a browser operating on the client.

8. The method of claim 7, where the object is a browser extension.

9. The method of claim 7, where the object is external to the browser.

10. The method of claim 1, where the application includes a first function for performing a first process and a second function for performing a second process, and
where replacing the function with the proxy function includes:
replacing the first function with a first proxy function to cause the application to invoke the first proxy function when the first process is to be performed, and
replacing the second function with a second proxy function to cause the application to invoke the second proxy function when the second process is to be performed.

11. The method of claim 1, further comprising:
identifying, based on the function accessing the server to perform the process, the function, as a function to be replaced, and
where replacing the function with the proxy function is based on identifying the function.

12. A non-transitory computer-readable medium storing instructions, the instructions comprising:
one or more instructions which, when executed by a computing device, causes the computing device to store an application that includes a function to perform a process,
where the application invokes the function when the process is to be performed,
where, when invoked by the application, the function accesses, via a network, a server to perform the process,
where the server processes the function to obtain data, and
where the application receives the obtained data, via a communication layer of the client;
one or more instructions which, when executed by the computing device, causes the computing device to replace the function with a proxy function to modify the application,
where replacing the function with the proxy function to modify the application causes the application to invoke the proxy function when the process is to be performed;
one or more instructions which, when executed by the computing device, causes the computing device to determine that the process is to be performed;
one or more instructions which, when executed by the computing device, causes the computing device to invoke the proxy function, where the proxy function is invoked based on determining that the process is to be performed;
one or more instructions which, when executed by the computing device, causes the computing device to determine, based on invoking the proxy function, whether to access the server or the alternate resource to perform the process, where the one or more instructions to determine whether to access the server or the alternate resource include at least one of:
one or more instructions to determine whether the network is available, or
one or more instructions to determine whether the server is available;
one or more instructions which, when executed by the computing device, causes the computing device to access the alternate resource when:
the network is unavailable, or
the server is unavailable; and
one or more instructions which, when executed by the computing device, causes the computing device to access the server when the network is available to the application and the server is available.

13. The computer-readable medium of claim 12, where the alternate resource is stored on the client, and
where the alternate resource includes one or more instructions to replicate actions of the server during execution of the application.

14. The computer-readable medium of claim 12, where the one or more instructions to determine whether to access the server or the alternate resource include:
one or more instructions to determine whether the client is working in an offline mode, where the client works in the offline mode when the network and the server are unavailable.

15. The computer-readable medium of claim 12, where the alternate resource is located on a device that is external to the client.

16. The computer-readable medium of claim 12, where the application is an Asynchronous JavaScript and XML (AJAX) application, and
where the one or more instructions to replace the function with the proxy function include:
one or more instructions to replace the function with the proxy function at a runtime of the AJAX application.

17. The computer-readable medium of claim 12, where the one or more instructions to access the alternate resource include:
one or more instructions to access the proxy function via a second communication layer of the client that is different than the communication layer of the client, where the second communication layer is associated with the alternate resource and the communication layer is associated with the server.

18. The computer-readable medium of claim 12, where the proxy function is associated with an object that is of a browser operating on the client.

19. The computer-readable medium of claim 18, where the object is a browser extension.

20. The computer-readable medium of claim 18, where the object is external to the browser.

21. The computer-readable medium of claim 12, where the application includes a first function for performing a first process and a second function for performing a second process, and
where the one or more instructions to replace the function with the proxy function include:

one or more instructions to replace the first function with a first proxy function, where replacing the first function with the first proxy function causes the application to invoke the first proxy function when the first process is to be performed, and one or more instructions to replace the second function with a second proxy function, where replacing the second function with the second proxy function causes the application to invoke the second proxy function when the second process is to be performed.

22. The computer-readable medium of claim 12, where the instructions further comprise:

one or more instructions to identify each function included, in the application, that accesses the server during execution of the application, and where replacing the function with the proxy function is based on identifying each function that accesses the server.

23. A system comprising:

a client to:

store an application that includes a function to perform a process, where the application invokes the function when the process is to be performed, where, when invoked by the application, the function calls, via a network, a server to perform the process, where the server processes the function to obtain data, and where the application receives the obtained data, via a communication layer of the client, replace the function with a proxy function to modify the application, where replacing the function with the proxy function to modify the application causes the application to invoke the proxy function when the process is to be performed, determine that the process is to be invoked, invoke the proxy function, where the proxy is invoked based on determining that the process is to be performed, determine, based on invoking the proxy function, whether to call the server or an alternate resource to perform the process, where, when determining whether to call the server or the alternate resource, the client is to:

determine whether the network is available, or determine whether the server is available, call the alternate resource when the network or the server is unavailable, and call the server when the network and the server are available.

24. The system of claim 23, where the alternate resource is stored on the client, and replicates the actions of the server during execution of the application.

25. The system of claim 23, where, when determining whether to call the server or the alternate resource, the client is further to:

determine whether the client is working in an offline mode, where the client works in the offline mode when the network and the server are unavailable.

26. The system of claim 23, where the alternate resource is located on a device that is external to the client.

27. The system of claim 23, where the application is an Asynchronous JavaScript and XML (AJAX) application, and where the client replaces the function with the proxy function at a runtime of the AJAX application.

28. The system of claim 23, where the client is further to:

call the proxy function via a second communication layer of the client that is different than the communication layer of the client, where the second communication layer is associated with the alternate resource and the communication layer is associated with the server.

29. The system of claim 23, where the proxy function is associated with an object of a browser.

30. The system of claim 29, where the object is a browser extension.

31. The system of claim 29, where the object is external to the browser.

32. The system of claim 23, where the application includes a first function for performing a first process and a second function for performing a second process, and where, when replacing the function with the proxy function, the client is to:

replace the first function with a first proxy function to cause the application to invoke the first proxy function when the first process is to be performed, and replace the second function with a second proxy function to cause the application to invoke the second proxy function when the second process is to be performed.

33. The system of claim 23, where the client is further to:

determine whether one or more functions, included in the application, access the server during execution of the application, and where replacing the function with the proxy function is based on determining whether the one or more functions access the server.

* * * * *

UNITED STATES PATENT AND TRADEMARK OFFICE
CERTIFICATE OF CORRECTION

PATENT NO.       : 8,255,921 B2
APPLICATION NO.  : 11/809162
DATED            : August 28, 2012
INVENTOR(S)      : Erik V. Arvidsson et al.

Page 1 of 1

It is certified that error appears in the above-identified patent and that said Letters Patent is hereby corrected as shown below:

Column 6, claim 2, line 61 should read: "stored on the client and replicates actions of the server"

Signed and Sealed this
Sixth Day of November, 2012

David J. Kappos
*Director of the United States Patent and Trademark Office*